US011105721B1

(12) United States Patent
Chen et al.

(10) Patent No.: US 11,105,721 B1
(45) Date of Patent: Aug. 31, 2021

(54) COMPLEX PRESSURE ENVIRONMENT TEST DEVICE

(71) Applicant: JIANGSU UNIVERSITY OF SCIENCE AND TECHNOLOGY, Zhenjiang (CN)

(72) Inventors: Yun Chen, Zhenjiang (CN); Jian Zhang, Zhenjiang (CN); Si Zhang, Zhenjiang (CN); Wenxian Tang, Zhanjiang (CN); Yueyang Wang, Zhanjiang (CN); Zhengdao Hua, Zhenjiang (CN); Baoji Yin, Zhenjiang (CN); Yongmei Zhu, Zhenjiang (CN)

(73) Assignee: JIANGSU UNIVERSITY OF SCIENCE AND TECHNOLOGY, Zhenjiang (CN)

( * ) Notice: Subject to any disclaimer, the term of this patent is extended or adjusted under 35 U.S.C. 154(b) by 0 days.

(21) Appl. No.: 17/273,598

(22) PCT Filed: Aug. 26, 2019

(86) PCT No.: PCT/CN2019/102423
§ 371 (c)(1),
(2) Date: Mar. 4, 2021

(87) PCT Pub. No.: WO2020/048327
PCT Pub. Date: Mar. 12, 2020

(30) Foreign Application Priority Data

Sep. 5, 2018 (CN) .......................... 201811034988.8

(51) Int. Cl.
*G01N 3/12* (2006.01)
(52) U.S. Cl.
CPC ....... *G01N 3/12* (2013.01); *G01N 2203/0048* (2013.01); *G01N 2203/0202* (2013.01); *G01N 2203/0232* (2013.01)

(58) Field of Classification Search
CPC ............. G01N 3/12; G01N 2203/0048; G01N 2203/0202; G01N 2203/0232
See application file for complete search history.

(56) References Cited

U.S. PATENT DOCUMENTS 4,419,881 A * 12/1983 Gentiluomo ........... G01N 3/307
73/167
10,234,367 B2 * 3/2019 Tsuruta ............... G01M 5/0058
(Continued)

FOREIGN PATENT DOCUMENTS

| CN | 102297808 A | 12/2011 |
| CN | 105445108 A | 3/2016 |

(Continued)

OTHER PUBLICATIONS

Machine translation of CN 112051155 (Year: 2020).*
(Continued)

*Primary Examiner* — Natalie Huls
(74) *Attorney, Agent, or Firm* — Collard & Roe, P.C.

(57) ABSTRACT

A complex pressure environment test device, comprising a test table and a hydraulic control system. The test table comprises a base for fastening a closure head under test, and an outer cover; the base has water inlets and outlets. The hydraulic control system comprises a watering hydraulic pump, a pressurizing hydraulic pump, and a pilot-operated overflow valve; the watering hydraulic pump is separately connected to a first two-position two-way valve and a second two-position two-way valve; the second two-position two-way valve is connected to a second one-way valve; the second one-way valve is separately connected to a water inlet and a first pilot-operated pressure regulating valve; the first pilot-operated pressure regulating valve is separately
(Continued)

connected to a first remote pressure regulating valve and a first one-way valve. There is also a hydraulic circuit is present and used for testing.

10 Claims, 10 Drawing Sheets

(56) References Cited

U.S. PATENT DOCUMENTS

| | | | |
|---|---|---|---|
| 10,378,335 B2 * | 8/2019 | Chong | E21B 47/10 |
| 10,656,063 B2 * | 5/2020 | Daley | G01M 3/24 |
| 2020/0232869 A1 * | 7/2020 | Wu | G01M 13/005 |

FOREIGN PATENT DOCUMENTS

| | | | | |
|---|---|---|---|---|
| CN | 106644537 A | | 5/2017 | |
| CN | 106840896 A | | 6/2017 | |
| CN | 109060547 A | | 12/2018 | |
| CN | 112051155 | * | 12/2020 | G01N 3/12 |
| JP | S54-51581 A | | 4/1979 | |

OTHER PUBLICATIONS

International Search Report of PCT/CN2019/102423 in Chinese, dated Nov. 27, 2019 with English translation.
Written Opinion of the International Searching Authority of PCT/CN2019/102423 in Chinese, dated Nov. 27, 2019 with English translation.

* cited by examiner

COMPLEX PRESSURE ENVIRONMENT TEST DEVICE

CROSS REFERENCE TO RELATED APPLICATIONS

This application is the National Stage of PCT/CN2019/102423 filed on Aug. 26, 2019, which claims priority under 35 U.S.C. § 119 of Chinese Application No. 201811034988.8, filed on Sep. 5, 2018, the disclosure of which is incorporated by reference. The international application under PCT article 21(2) was not published in English.

BACKGROUND OF THE INVENTION

Field of the Invention

The present invention relates to a pressure resistance test device for diving equipment, and particular to, a complex pressure environment test device.

Description of Related Art

In February 2016, China published the Law on the Exploration and Development of Resources in Deep Seabed Areas, to legally support the research and development of deep-sea scientific and technological equipment including deep-sea submersibles. Moreover, a closure head, as a seal protection device for an opening, such as an outlet, an inlet, or an observation window, on a pressure hull of a submersible, plays a vital role in safety of the submersible, and a device capable of accurately simulating a water pressure environment of the closure head is of profound significance in design and development of the closure head.

The existing test pressure devices are mainly classified into two types:

One type is mechanical pressurization, which is mainly replacing a manner in which an entire pressure resistance device is subject to a pressure with a manner in which a pressure is applied to an end portion by means of a device such as a tensile machine. A device of this type is simple and convenient, for which seal and pressure control problems of a water pressure simulation environment do not need to be considered. However, the device of this type is mainly used for pressure testing of a cylindrical pressure hull. Simulation of a pressure on the closure head is not accurate enough. In addition, it is difficult to simulate that a real underwater closure head is subject to a pressure.

One type is uniform water pressure distribution, which is mainly placing, by sealing a bottom of a closure head, the entire closure head inside a pressure well full of water, and simulating a pressure on the closure head through watering. A test device of this type can more accurately simulate that the closure head is subject to a pressure underwater, but most devices of this type distribute external pressures uniformly, and cannot simulate that the closure head is subject to an internal pressure or internal and external pressures at the same time. In addition, it is difficult to simulate that the closure head is subject to a complex changed water pressure. In addition, when the device of this type simulates a pressure, a bottom of the closure head needs to be sealed with a thick steel plate, which increases preparations for testing on the closure head, and it is difficult to recycle the steel plate, which increases test costs. In addition, the thick steel plate greatly increases the overall mass of the closure head. During testing, it is relatively difficult to place and take out the closure head. Therefore, the device of this type has specific limitations.

SUMMARY OF THE INVENTION

Objective of the Invention: An objective of the present invention is to provide a complex pressure environment test device adopted to simulate an internal pressure, an external pressure, internal and external pressures, and a dynamic pressure on a closure head.

Technical Solution: A complex pressure environment test device according to the present invention includes a test table and a hydraulic control system, where the hydraulic control system is connected to a computer; the test table includes a base for fastening a closure head under test and an outer cover; the base is provided with an outer cavity water inlet, an inner cavity water inlet, an inner cavity water outlet, and an outer cavity water outlet; the hydraulic control system includes a watering hydraulic pump, a pressurizing hydraulic pump, and a pilot-operated overflow valve; the watering hydraulic pump is separately connected to a first two-position two-way valve and a second two-position two-way valve; the second two-position two-way valve is connected to a second one-way valve; the second one-way valve is separately connected to the outer cavity water inlet and a first pilot-operated pressure regulating valve; the first pilot-operated pressure regulating valve is separately connected to a first remote pressure regulating valve and a first one-way valve; the first two-position two-way valve is connected to a third one-way valve; the third one-way valve is connected to a third two-position two-way valve, a fourth two-position two-way valve, and a first two-position three-way valve; the fourth two-position two-way valve is connected to the inner cavity water inlet; the first two-position three-way valve is separately connected to a speed regulating valve and a second pilot-operated pressure regulating valve; the second pilot-operated pressure regulating valve is separately connected to a second remote pressure regulating valve, a seventh one-way valve, and a sixth one-way valve; both the sixth one-way valve and the speed regulating valve are connected to a second two-position three-way valve; the second two-position three-way valve is connected to a sixth two-position two-way valve; the pressurizing hydraulic pump is separately connected to the sixth two-position two-way valve, the pilot-operated overflow valve, the inner cavity water outlet, and a fifth one-way valve, the outer cavity water outlet is connected to a fourth one-way valve; and both the fifth one-way valve and the fourth one-way valve are connected to a fifth two-position two-way valve.

A first pressure gauge is disposed between the second one-way valve and the first pilot-operated pressure regulating valve, a second pressure gauge is disposed between the first two-position three-way valve and the second pilot-operated pressure regulating valve, and a third pressure gauge is disposed between the first two-position three-way valve and the speed regulating valve.

A three-segment locating ring is disposed on the base, the closure head under test is placed in the middle of the three-segment locating ring and is in contact with the base, the closure head under test is radially equipped with a three-segment snap ring and is fastened by a pressure ring in a normal direction, a bottom of the three-segment snap ring is in contact with the three-section locating ring, and a bottom of the pressure ring is in contact with the three-section locating ring, to make the seal more reliable. An internal sealing environment and an external sealing environment of the closure head can be formed independently. In addition, inclined surfaces under pressure can make parts come into closer contact and completely fit each other for being subject to a pressure, thereby increasing stability and safety in a test process. A third seal ring and a third seal gasket are disposed between the closure head under test and the base. A rubber gasket is disposed between the closure head under test and the three-segment snap ring, to make them fit more closely.

A cushion block is fastened to an inner side of the closure head under test, and can reduce, to a large extent, internal space of the closure head during testing, to accelerate watering and water discharging processes. An observation window is mounted on the outer cover. A first seal ring and a first seal gasket are disposed at a joint between the observation window and the outer cover. The pilot-operated overflow valve, the watering hydraulic pump, the pressurizing hydraulic pump, and the fifth two-position two-way valve are all connected to the water tank, and configured to regulate a pressure of a pressurizing system and ensure that an output pressure is a constant pressure. A second seal ring and a second seal gasket are disposed between the outer cover and the base.

Working Principle: When a pressure, that is, an external pressure, is applied to an outer side of the closure head under test, the third two-position two-way valve is in an on position, and the fourth two-position two-way valve is in an off position. When a pressure, that is, an internal pressure, is applied to an inner side of the closure head under test, the third two-position two-way valve is in an off position, and the fourth two-position two-way valve is in an on position. When a pressure is applied to the inner and outer sides of the closure head under test simultaneously, both the third two-position two-way valve and the fourth two-position two-way valve are in an on position. A default working position of the second two-position three-way valve is a right-side working position. The first two-position three-way valve is in a default working position and configured to pressurize the closure head under test at a constant pressure. The sixth one-way valve is configured to maintain internal and external pressure values of the closure head under test. The second pilot-operated pressure regulating valve is configured to regulate an internal pressure of the closure head under test, and the second pressure gauge is configured to record the internal pressure. The second pilot-operated pressure regulating valve is connected to the second one-way valve and the second remote pressure regulating valve. The seventh one-way valve can prevent a pressure from suddenly changing. A signal is sent to the second remote pressure regulating valve by monitoring data in real time, to regulate a pressure of the second pilot-operated pressure regulating valve, thereby achieving pressure control and pressure relief. Likewise, the first pilot-operated pressure regulating valve is configured to regulate an external pressure of the closure head under test. The first pressure gauge is configured to record the external pressure. When the second two-position three-way valve is in a left-side working position, the first two-position three-way valve is in a power-on working position, and pressure water passes through the speed regulating valve. The speed regulating valve is configured to regulate a flow rate of water inside a pipeline, to achieve an effect of outputting a changed pressure. The third pressure gauge is configured to record the changed pressure, to achieve an objective of applying changed pressures to an inner side and an outer side of the closure head under test. After testing is performed on the closure head under test, the fifth two-position two-way valve is in an on position, pressure water passes through the fourth one-way valve and the fifth one-way valve and is discharged to the water tank. If internal pressure testing is separately performed, the fourth one-way valve can prevent water in a pipe from flowing back to the outer cavity. If external pressure testing is separately performed, the fifth one-way valve can prevent water in a pipe from flowing back to the inner cavity.

Advantageous Effect: Compared with the prior art, the present invention has the following prominent features:

1. A hydraulic control solution is provided. A hydraulic circuit is subjected to pressure relief and pressure maintaining separately by means of different hydraulic valves according to pressures in inner and outer cavities of the closure head under test. External pressure, internal pressure, internal and external mixed pressure and changed pressure testing can be separately performed. By reading pressure data, internal and external pressures of the closure head can be regulated and controlled in real time to form any pressure difference required by the testing.

2. The closure head under test does not need to be welded with a thick and heavy base plate at the bottom, and is mounted on the test table in a clamping and embedding manner, leading to simple disassembly and convenience in replacement. In addition, the outer cover of the test table is provided with a transparent observation window, and a process of damaging the closure head in a test process can be dynamically observed by means of a camera, to help regulate a test pressure more intuitively, and obtain damage situations of the closure head under different pressure values.

3. Contact between the outer cover and the base and contact between the closure head under test and the base are both three-segment contact, that is, flat surface-inclined surface-flat surface contact, and in addition, multi-layered sealing is disposed, so that an internal sealing environment and an external sealing environment of the closure head can be formed independently. Not only the outer cover and the closure head under test come into closer contact under pressure, to completely fit each other, but also the outer cover and the closure head under test are in full contact with the base in a squeezed manner, so that sealing is more reliable in a test process, thereby increasing stability and safety in the test process.

4. Installation between the closure head under test and the base includes three steps. First, pre-locating is performed, then, radial clamping is performed, and finally, normal-direction pressing is performed. In addition, circumferential contact is always used to make the closure head under test be subject to pressures uniformly, thereby ensuring that the closure head under test is not loosened under pressure, and a test process is safe and reliable.

DETAILED DESCRIPTION OF THE INVENTION

Figure 1:
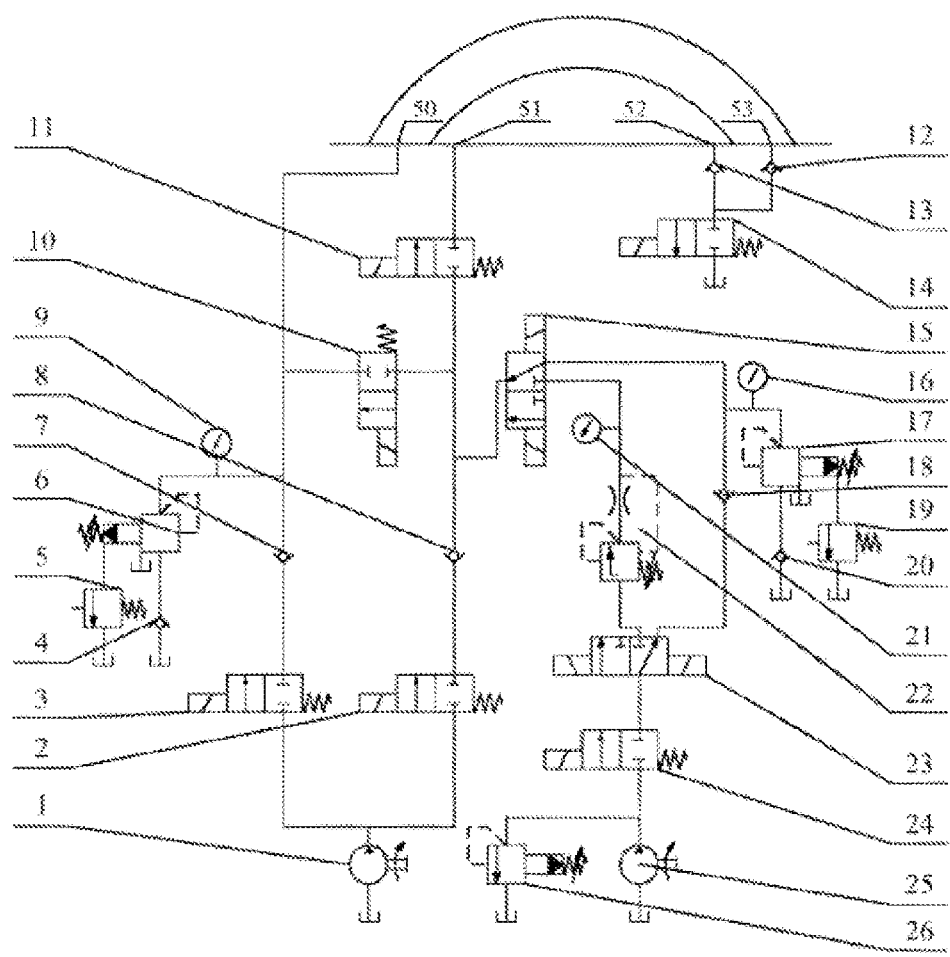
FIG. 1 is a working principle diagram of the present invention.
Figure 2:
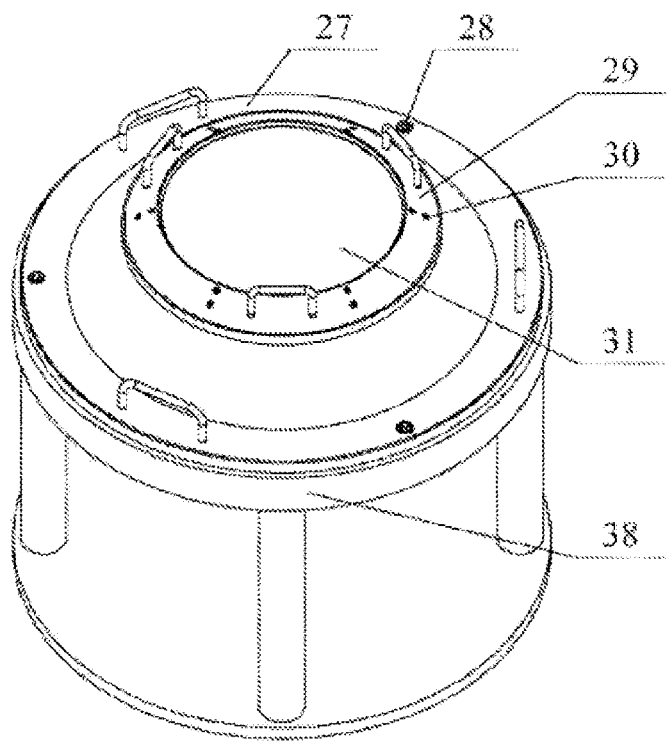
FIG. 2 is a three-dimensional diagram of the present invention.
Figure 3:
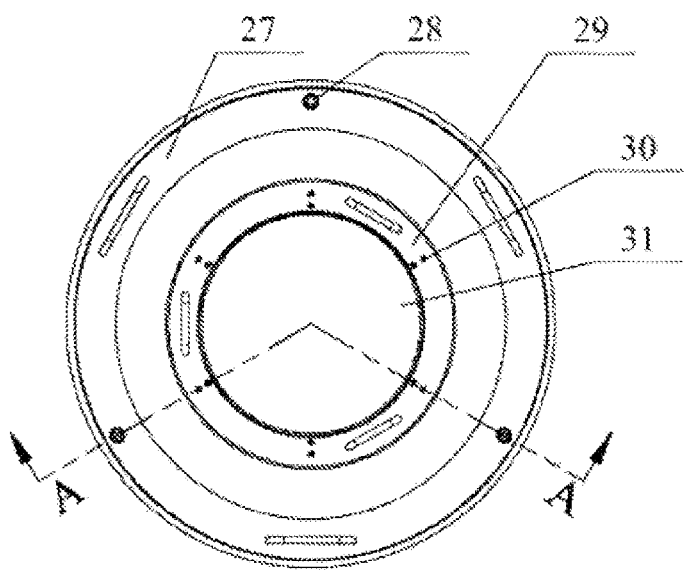
FIG. 3 is a top view of the present invention.
Figure 4:
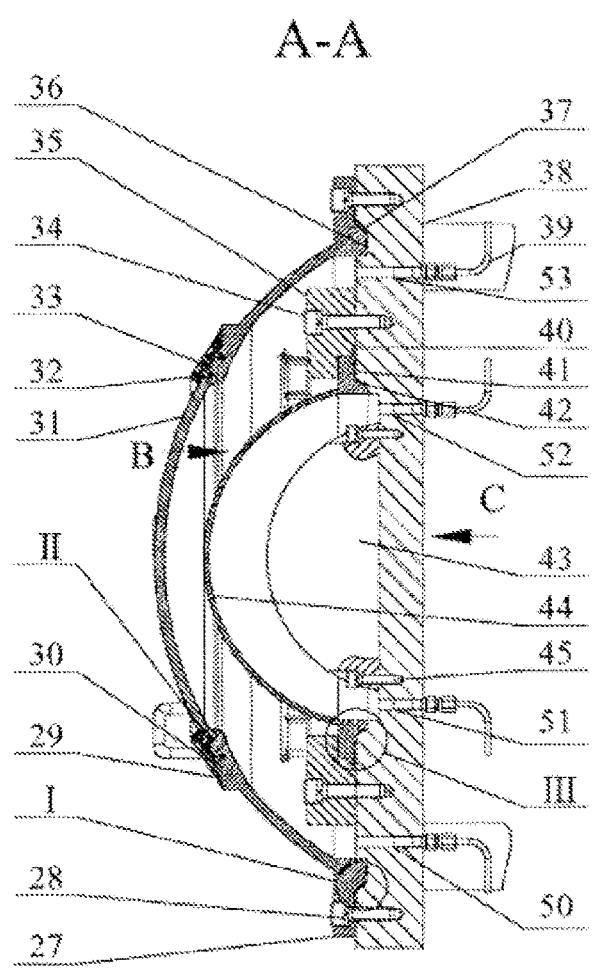
FIG. 4 is a cross-sectional view of a plane A-A of the present invention.
Figure 5:
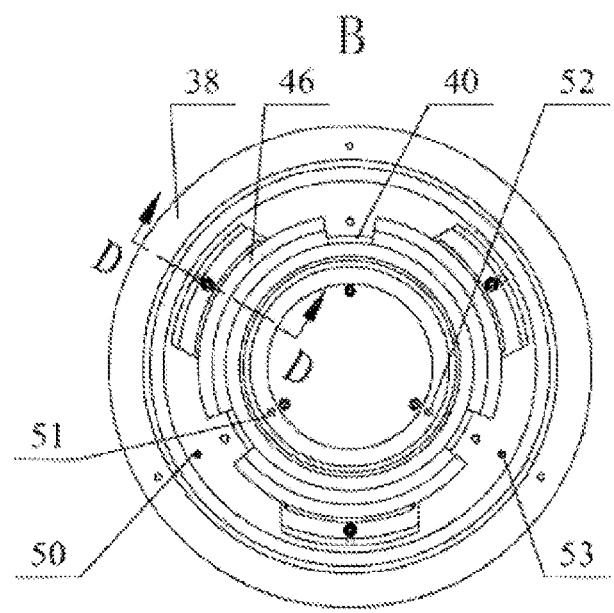
FIG. 5 is a view of FIG. 4 from a direction B.
Figure 6:
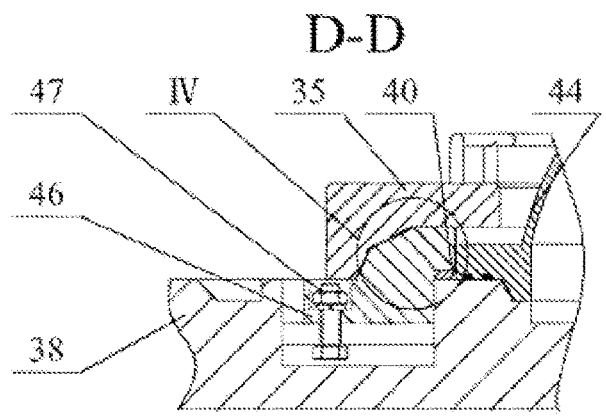
FIG. 6 is a cross-sectional view of a plane D-D of the present invention.
Figure 7:
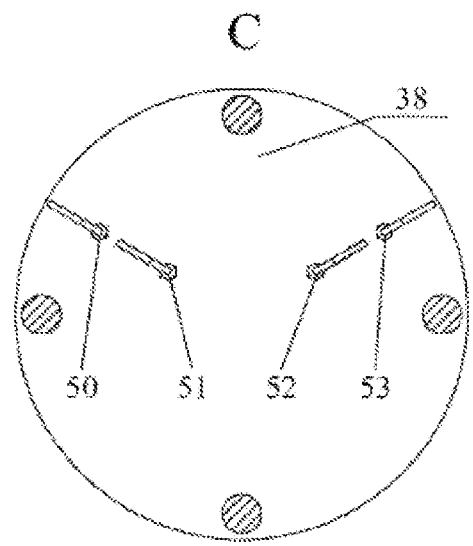
FIG. 7 is a view of FIG. 4 from a direction C.
Figure 8:
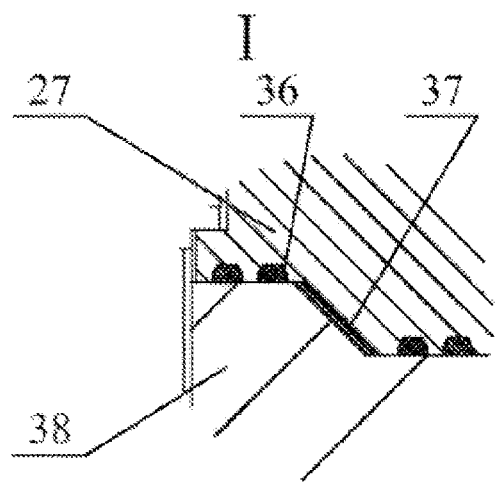
FIG. 8 is a partially enlarged diagram of the present invention at a position I.
Figure 9:
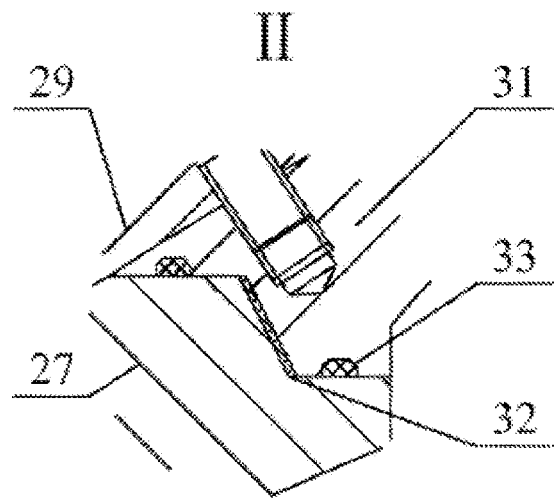
FIG. 9 is a partially enlarged diagram of the present invention at a position II.
Figure 10:
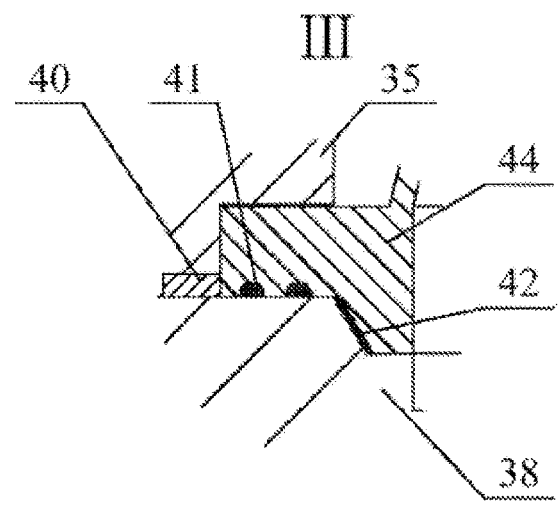
FIG. 10 is a partially enlarged diagram of the present invention at a position III.
Figure 11:
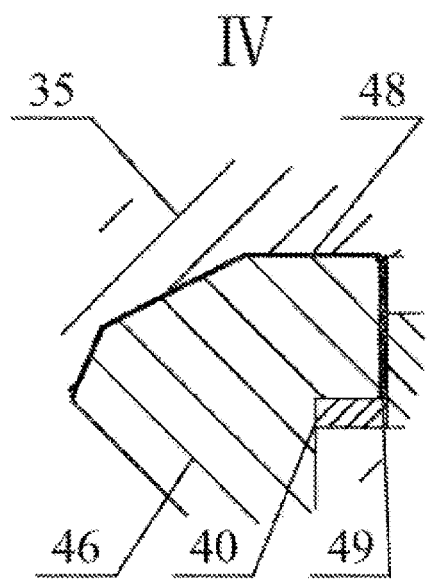
FIG. 11 is a partially enlarged diagram of the present invention at a position IV.
Figure 12:
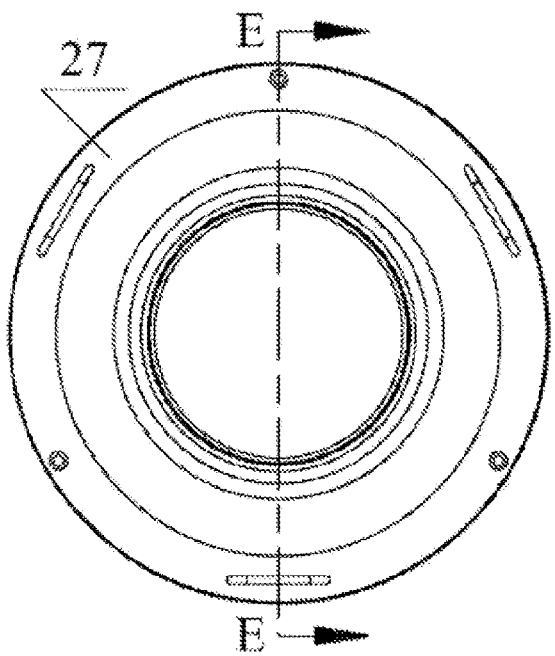
FIG. 12 is a top view of an outer cover 27 of the present invention.
Figure 13:
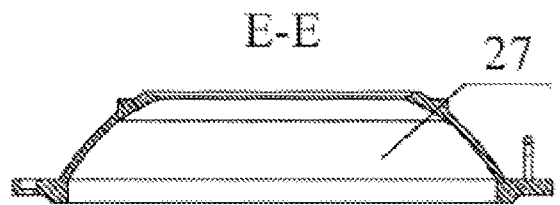
FIG. 13 is a cross-sectional view of a plane E-E of the present invention.
Figure 14:
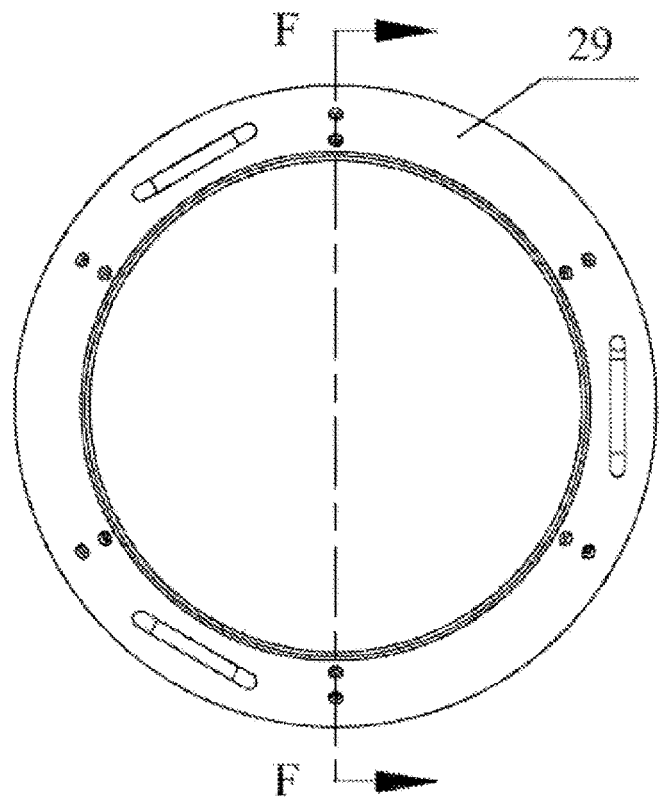
FIG. 14 is a top view of a fastening ring 29 of the present invention.
Figure 15:
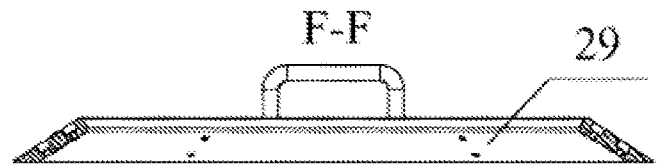
FIG. 15 is a cross-sectional view of a plane F-F of the present invention.
Figure 16:
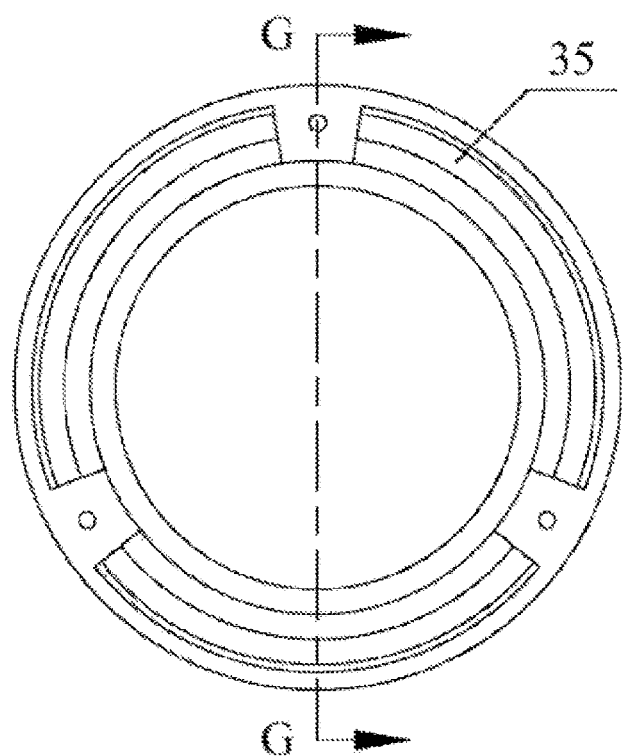
FIG. 16 is a top view of a pressure ring 35 of the present invention.
Figure 17:
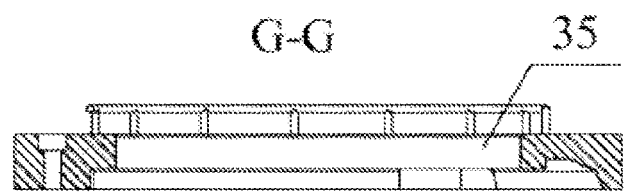
FIG. 17 is a cross-sectional view of a plane G-G of the present invention.
Figure 18:
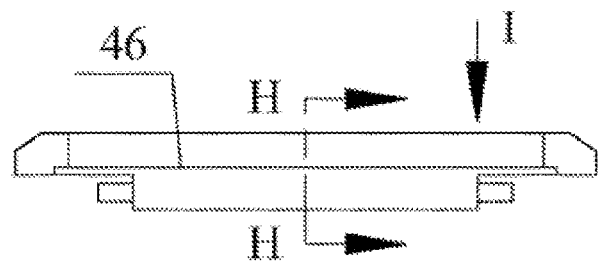
FIG. 18 is a front view of a snap ring 46 of the present invention.
Figure 19:
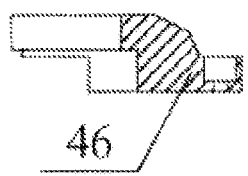
FIG. 19 is a cross-sectional view of a plane H-H of the present invention.
Figure 20:
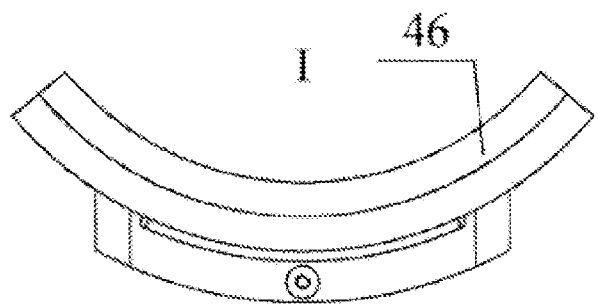
FIG. 20 is a top view of a snap ring 46 of the present invention.
Figure 21:
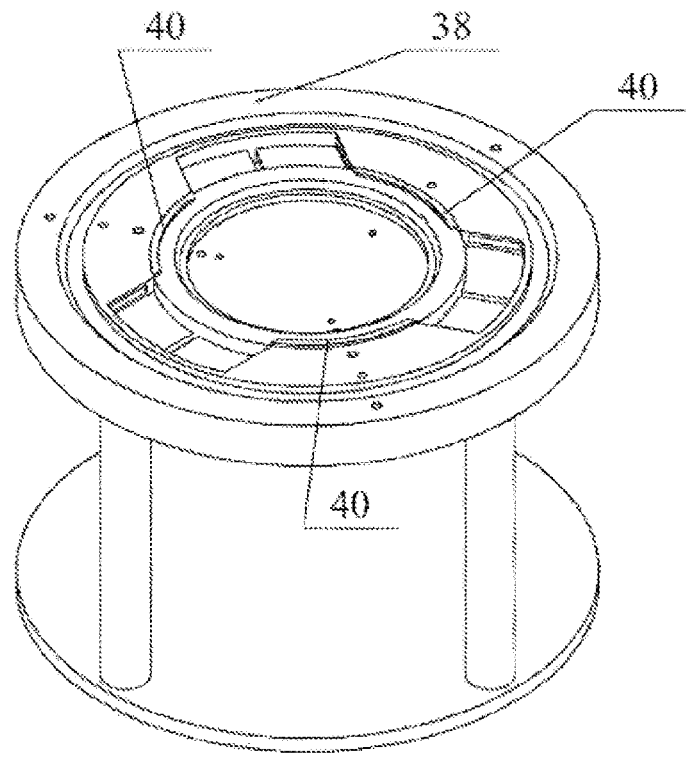
FIG. 21 is a three-dimensional diagram of a base 38 of the present invention.

As shown in FIG. 1, an inlet of a watering hydraulic pump 1 is connected to a water tank, and an outlet thereof is separately connected to a first two-position two-way valve 2 and a second two-position two-way valve 3. The first two-position two-way valve 2 is configured to control watering on an inner side of a closure head 44 under test. The second two-position two-way valve 3 is configured to control watering on an outer side of the closure head 44 under test. The second two-position two-way valve 3 is connected to a second one-way valve 7 configured to prevent backflow of water inside a pipeline after watering is stopped and when a pressure is applied. The second one-way valve 7 is connected to an outer cavity water inlet 50 through a water pressure connector 39. Moreover, the second one-way valve 7 is connected to a first pilot-operated pressure regulating valve 6, and a first pressure gauge 9 is disposed between the two. The first pilot-operated pressure regulating valve 6 is separately connected to a first remote pressure regulating valve 5 and a first one-way valve 4. The first two-position two-way valve 2 is connected to a third one-way valve 8 configured to prevent backflow of water inside a pipeline after watering is stopped and when a pressure is applied. The third one-way valve 8 is connected to a third two-position two-way valve 10, a fourth two-position two-way valve 11, and a first two-position three-way valve 15. An outlet of the third two-position two-way valve 10 is connected to the second one-way valve 7. The fourth two-position two-way valve 11 is connected to an inner cavity water inlet 51 through the water pressure connector 39. The first two-position three-way valve 15 is connected to a speed regulating valve 22, and a third pressure gauge 21 is disposed between the two. Moreover, the first two-position three-way valve 15 is connected to a second pilot-operated pressure regulating valve 17, and a second pressure gauge 16 is disposed between the two. The second pilot-operated pressure regulating valve 17 is separately connected to a second remote pressure regulating valve 19 and a seventh one-way valve 20. Moreover, an inlet of the second pilot-operated pressure regulating valve 17 is connected to a sixth one-way valve 18. Both the sixth one-way valve 18 and the speed regulating valve 22 are connected to a second two-position three-way valve 23. An inlet of the second two-position three-way valve 23 is connected to a sixth two-position two-way valve 24 configured to control on and off of a pressurizing system. An inlet of a pressurizing hydraulic pump 25 configured to apply pressures to inner and outer sides of the closure head 44 under test is connected to the water tank, and an outlet thereof is separately connected to the sixth two-position two-way valve 24 and a pilot-operated overflow valve 26 configured to regulate a pressure of the pressurizing system and ensure that an output pressure is a constant pressure. An inner cavity water outlet 52 and an outer cavity water outlet 53 are respectively connected to a fifth one-way valve 13 and a fourth one-way valve 12 through the water pressure connector 39. Both the one-way valves are connected to a fifth two-position two-way valve 14. The fifth two-position two-way valve 14 is connected to the water tank.

As shown in FIG. 2 to FIG. 13, a test table includes a base 38, the closure head 44 under test, and an outer cover 27. The outer cover 27 is connected to the base 38 through a first screw group 28, and a second seal ring 36 and a second seal gasket 37 are disposed between the two. The outer cover 27 is provided with an observation hole. An observation window 31 is mounted at the observation hole. A first seal ring 33 and a first seal gasket 32 are disposed between the observation window 31 and the outer cover 27. A fastening ring 29 connects the outer cover 27 and the observation window 31 by means of a second screw group 30.

The base 38 is welded with a three-segment locating ring 40 in the middle, the closure head 44 under test is placed in the middle of the three-segment locating ring 40 and is into contact with the base 38, and a third seal ring 41 and a third seal gasket 42 are disposed between the closure head 44 under test and the base 38. The closure head 44 under test is radially equipped with a three-segment snap ring 46, and a rubber gasket 49 is disposed between the two. In addition, a bottom of the snap ring 46 is in contact with the three-segment locating ring 40. The snap ring 46 and the base 38 slidably match each other through a clamping groove, and in addition, the foregoing two are fastened through a fastening bolt group 47. The closure head 44 under test is fastened by means of a pressure ring 35 in a normal direction. A bottom of the pressure ring 35 is in contact with the three-segment locating ring 40 and the snap ring 46. In addition, the pressure ring 35 is fastened to the base 38 by means of a third bolt group 34. A cushion block 43 is fastened to an interior of the closure head 44 under test, the cushion block 43 is fastened to the base 38 through a fourth screw group 45, and the cushion block 43 can reduce, to a large extent, internal space of the closure head during testing, to accelerate watering and water discharging processes.

Installation of the closure head 44 under test includes three steps: first, placing the closure head 44 under test inside the three-segment locating ring 40, and pre-locating the closure head 44 under test quickly to make the closure head 44 under test fit the base 38 in an embedding manner; then, pushing the snap ring 46 to radially block the closure head 44 under test, meanwhile, placing a rubber gasket 49 therebetween, to make them fit each other more closely, and screwing up the fastening bolt group 47 to fasten the snap ring 46, to prevent the closure head 44 under test from being loosened under pressure; and finally, placing the pressure ring 35 above the closure head 44 under test and the snap ring 46, where gap parts of the three-segment snap ring 46 are positions at which the pressure ring 35 is screwed up by means of screws. The pressure ring 35 not only directly tightly presses the closure head 44 under test in a normal direction, to prevent the closure head 44 under test from shaking, but also is in contact with the snap ring 46 in a three-segment manner. When inclined contact surfaces enable the pressure ring 35 to fit the snap ring 46 better when the closure head 44 under test is subject to pressures and produce outward acting forces, to prevent the snap ring 46 from being loosened. In addition, a red paper gasket 48 is placed between the pressure ring 35 and the snap ring 46, to make the contact closer.

Specific steps of filling an inner cavity with water are: adjusting the fifth two-position two-way valve 14 to an on position; further, adjusting the first two-position two-way valve 2 and the fourth two-position two-way valve 11 to an on position; turning on the watering hydraulic pump 1, to fill the inner cavity of the closure head 44 under test with water; and when there is water flowing out of a water outlet of the fifth two-position two-way valve 14 to the water tank, adjusting the first two-position two-way valve 2 and the fourth two-position two-way valve 11 to an off position, and meanwhile, adjusting the fifth two-position two-way valve 14 to an off position, where the watering hydraulic pump 1 stops working simultaneously, so that the water filling is completed.

Specific steps of filling an outer cavity with water are: adjusting the fifth two-position two-way valve 14 to an on position; further, adjusting the second two-position two-way valve 3 to an on position; turning on the watering hydraulic pump 1, to fill the outer cavity of the closure head 44 under test with water; and when there is water flowing out of a water outlet of the fifth two-position two-way valve 14 to the water tank, adjusting the second two-position two-way valve 3 to an off position, and meanwhile, adjusting the fifth two-position two-way valve 14 to an off position, where the watering hydraulic pump 1 stops working simultaneously, so that the water filling is completed.

Specific steps of simultaneously filling inner and outer cavities with water are: adjusting the fifth two-position two-way valve 14 to an on position; further, adjusting the first two-position two-way valve 2, the second two-position two-way valve 3, and the fourth two-position two-way valve 11 to an on position; turning on the watering hydraulic pump 1, to fill the inner cavity of the closure head 44 under test with water; and when there is water flowing out of a water outlet of the fifth two-position two-way valve 14 to the water tank, adjusting the first two-position two-way valve 2, the second two-position two-way valve 3, and the fourth two-position two-way valve 11 to an off position, and meanwhile, adjusting the fifth two-position two-way valve 14 to an off position, where the watering hydraulic pump 1 stops working simultaneously, so that the water filling is completed.

Specific steps of separately pressurizing the inner cavity are as follows: After the water filling is completed, the first two-position three-way valve 15 is in a default working position, that is, a controllable constant-pressure loading working position, and the sixth one-way valve 18 can prevent a backflow problem of water during the water filling. The sixth two-position two-way valve 24 is adjusted to an on position, the second two-position three-way valve 23 is maintained in a default position, and the fourth two-position two-way valve 11 is adjusted to an on position. Because of existence of the third one-way valve 8, it is ensured that a pipeline is full of water before pressurization. In this case, the pressurizing hydraulic pump 25 works to perform pressurization until a predetermined water pressure required by the testing is satisfied. In this case, the sixth one-way valve 18 can ensure stability of a water pressure in a circuit. A pressure value of an internal pressure of the closure head 44 under test can be read by means of the second pressure gauge 16.

Specific steps of separately pressurizing the outer cavity are as follows: After the water filling is completed, the first two-position three-way valve 15 is in a default working position, that is, a controllable constant-pressure loading working position, and the sixth one-way valve 18 can prevent a backflow problem of water during the water filling. The sixth two-position two-way valve 24 is adjusted to an on position, the second two-position three-way valve 23 is maintained in a default position, and the third two-position two-way valve 10 is adjusted to an on position. Because of existence of the second one-way valve 7, it is ensured that a pipeline is full of water before pressurization. In this case, the pressurizing hydraulic pump 25 works to perform pressurization until a predetermined water pressure required by the testing is satisfied. In this case, the sixth one-way valve 18 can ensure stability of a water pressure in a circuit. A pressure value of external pressure of the closure head 44 under test can be read by means of the first pressure gauge 9.

Specific steps of simultaneously pressurizing the inner and outer cavities are: adjusting the sixth two-position two-way valve 24, the fourth two-position two-way valve 11, and the third two-position two-way valve 10 to an on position, and maintaining the first two-position three-way valve 15 and the second two-position three-way valve 23 in a default position; and turning on the pressurizing hydraulic pump 25 to perform pressurization until a pressure value required by the testing is reached, and stopping the pressurization. Because the inner and outer cavities of the closure head 44 under test are synchronously pressurized by means of a same pipeline, pressure values of the inner and outer cavities are the same at this time. A pressure of the second pilot-operated pressure regulating valve 17 is regulated by means of the second remote pressure regulating valve 19, and a pressure of the first pilot-operated pressure regulating valve 6 is regulated by means of the first remote pressure regulating valve 5. Controllable pressure relief is performed on an internal pressure and an external pressure of the closure head 44 under test, so that the inner and outer cavities of the closure head 44 under test form any required pressure difference to achieve controllable damage.

Application of a changed pressure: An internal pressure is used as an example herein. Control manners of other pressures are the same as the above. After the water filling is completed, the first two-position three-way valve 15 and the second two-position three-way valve 23 are adjusted to a power-on working position, the fourth two-position two-way valve 11 and the sixth two-position two-way valve 24 are adjusted to a circulation working position, and the pressurizing hydraulic pump 25 is turned on. In this case, constant pressure water output by the pressurizing hydraulic pump 25 passes through the speed regulating valve 22, so that a controllable changed water pressure is output. The third pressure gauge 21 records a water pressure change. Damage situations of the closure head 44 under test under the changed pressure are recorded by means of the observation window 31.

Water discharging and pressure relief: After the pressurizing process ends, the fifth two-position two-way valve 14 is adjusted to an on position, to completely discharge water from the inner cavity or the outer cavity. The first screw group 28 and the third screw group 34 are then unscrewed, and the outer cover 27 and the pressure ring 35 are removed. The fastening bolt group 47 is loosened to push away the snap ring 46. The closure head 44 under test is taken out for a next set of tests.

What is claimed is:

1. A complex pressure environment test device, comprising a test table and a hydraulic control system, wherein the test table comprises a base (38) for fastening a closure head under test (44) and an outer cover (27); the base (38) is provided with an outer cavity water inlet (50), an inner cavity water inlet (51), an inner cavity water outlet (52), and an outer cavity water outlet (53); the hydraulic control system comprises a watering hydraulic pump (1), a pressurizing hydraulic pump (25), and a pilot-operated overflow valve (26); the watering hydraulic pump (1) is separately connected to a first two-position two-way valve (2) and a second two-position two-way valve (3); the second two-position two-way valve (3) is connected to a second one-way valve (7); the second one-way valve (7) is separately connected to the outer cavity water inlet (50) and a first pilot-operated pressure regulating valve (6); the first pilot-operated pressure regulating valve (6) is separately connected to a first remote pressure regulating valve (5) and a first one-way valve (4); the first two-position two-way valve (2) is connected to a third one-way valve (8); the third one-way valve (8) is connected to a third two-position two-way valve (10), a fourth two-position two-way valve (11), and a first two-position three-way valve (15); the fourth two-position two-way valve (11) is connected to the inner cavity water inlet (51); the first two-position three-way valve (15) is separately connected to a speed regulating valve (22) and a second pilot-operated pressure regulating valve (17); the second pilot-operated pressure regulating valve (17) is separately connected to a second remote pressure regulating valve (19), a seventh one-way valve (20), and a sixth one-way valve (18); both the sixth one-way valve (18) and the speed regulating valve (22) are connected to a second two-position three-way valve (23); the second two-position three-way valve (23) is connected to a sixth two-position two-way valve (24); the pressurizing hydraulic pump (25) is separately connected to the sixth two-position two-way valve (24), the pilot-operated overflow valve (26), the inner cavity water outlet (52), and a fifth one-way valve (13); the outer cavity water outlet (53) is connected to a fourth one-way valve (12); and both the fifth one-way valve (13) and the fourth one-way valve (12) are connected to a fifth two-position two-way valve (14).

2. The complex pressure environment test device according to claim 1, wherein a first pressure gauge (9) is disposed between the second one-way valve (7) and the first pilot-operated pressure regulating valve (6), a second pressure gauge (16) is disposed between the first two-position three-way valve (15) and the second pilot-operated pressure regulating valve (17), and a third pressure gauge (21) is disposed between the first two-position three-way valve (15) and the speed regulating valve (22).

3. The complex pressure environment test device according to claim 1, wherein a locating ring (40) is disposed on the base (38), the closure head under test (44) is placed in the middle of the locating ring (40) and is in contact with the base (38), closure head under test (44) is radially equipped with a snap ring (46) and is fastened by a pressure ring (35) in a normal direction, a bottom of the snap ring (46) is in contact with the locating ring (40), and a bottom of the pressure ring (35) is in contact with the locating ring (40).

4. The complex pressure environment test device according to claim 3, wherein a third seal ring (41) and a third seal gasket (42) are disposed between the closure head under test (44) and the base (38).

5. The complex pressure environment test device according to claim 3, wherein a rubber gasket (49) is disposed between the closure head under test (44) and the snap ring (46).

6. The complex pressure environment test device according to claim 1, wherein a cushion block (43) is fastened to an inner side of the closure head under test (44).

7. The complex pressure environment test device according to claim 1, wherein an observation window (31) is mounted on the outer cover (27).

8. The complex pressure environment test device according to claim 7, wherein a first seal ring (33) and a first seal gasket (32) are disposed at a joint between the observation window (31) and the outer cover (27).

9. The complex pressure environment test device according to claim 1, wherein the pilot-operated overflow valve (26), the watering hydraulic pump (1), the pressurizing hydraulic pump (25), and the fifth two-position two-way valve (14) are all connected to a water tank.

10. The complex pressure environment test device according to claim 1, wherein a second seal ring (36) and a second seal gasket (37) are disposed between the outer cover (27) and the base (38).

\* \* \* \* \*